US008898680B2

(12) United States Patent
Gleyzer

(10) Patent No.: US 8,898,680 B2
(45) Date of Patent: Nov. 25, 2014

(54) SYSTEM AND METHOD FOR SUPPORTING ASYNCHRONOUS MESSAGE PROCESSING IN A DISTRIBUTED DATA GRID

(71) Applicant: Oracle International Corporation, Redwood Shores, CA (US)

(72) Inventor: Gene Gleyzer, Lexington, MA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/671,395

(22) Filed: Nov. 7, 2012

(65) Prior Publication Data
US 2014/0109110 A1  Apr. 17, 2014

Related U.S. Application Data

(60) Provisional application No. 61/714,100, filed on Oct. 15, 2012.

(51) Int. Cl.
G06F 9/46 (2006.01)
G06F 17/30 (2006.01)
G06F 9/50 (2006.01)
H04L 12/26 (2006.01)
H04L 12/24 (2006.01)

(52) U.S. Cl.
CPC ...... H04L 43/0811 (2013.01); G06F 17/30067 (2013.01); G06F 9/5072 (2013.01); H04L 41/0668 (2013.01)
USPC .......................................... 719/313; 718/106

(58) Field of Classification Search
USPC .................................. 718/106; 719/313
See application file for complete search history.

(56) References Cited

U.S. PATENT DOCUMENTS

| 5,014,265 | A | 5/1991 | Hahne et al. | |
|---|---|---|---|---|
| 5,301,350 | A | 4/1994 | Rogan et al. | |
| 5,784,698 | A | 7/1998 | Brady et al. | |
| 6,070,202 | A | 5/2000 | Minkoff et al. | |
| 6,338,112 | B1 | 1/2002 | Wipfel et al. | |
| 6,826,597 | B1* | 11/2004 | Lonnroth et al. | 709/207 |
| 8,131,894 | B2 | 3/2012 | Cain et al. | |
| 2004/0083317 | A1* | 4/2004 | Dickson et al. | 710/22 |
| 2004/0172618 | A1* | 9/2004 | Marvin | 717/116 |
| 2006/0112174 | A1* | 5/2006 | L'Heureux et al. | 709/223 |
| 2006/0129516 | A1* | 6/2006 | Bradford et al. | 707/1 |
| 2007/0168336 | A1 | 7/2007 | Ransil et al. | |
| 2010/0005472 | A1* | 1/2010 | Krishnaraj et al. | 718/104 |
| 2010/0017461 | A1 | 1/2010 | Kokkevis et al. | |
| 2010/0037222 | A1* | 2/2010 | Tatsubori et al. | 718/100 |
| 2010/0060934 | A1 | 3/2010 | Bellert | |
| 2011/0004701 | A1* | 1/2011 | Panda et al. | 709/242 |

(Continued)

OTHER PUBLICATIONS

Tanenbaum, Andrew S., "*Modern operating systems*" Prentice-Hall, Inc., Upper Saddle River, New Jersey, 2001. 5 pages.

Primary Examiner — Charles E Anya
(74) Attorney, Agent, or Firm — Meyer IP Law Group

(57) ABSTRACT

A system and method can support asynchronous message processing in a distributed data grid. A cluster node in the distributed data grid can provide a message processor running on a message processing thread. The message processor can receive a request to process an incoming message from a service thread, wherein the request is associated with a continuation data structure. Then, the message processor can wrap the continuation data structure in a return message after processing the incoming message, and forward the return message to a service queue that is associated with the service thread.

20 Claims, 5 Drawing Sheets

(56) References Cited

U.S. PATENT DOCUMENTS

| | | |
|---|---|---|
| 2011/0225122 A1 | 9/2011 | Denuit et al. |
| 2012/0197840 A1 | 8/2012 | Oliver et al. |
| 2012/0197959 A1 | 8/2012 | Oliver et al. |
| 2012/0198455 A1 | 8/2012 | Lee et al. |
| 2012/0331029 A1 | 12/2012 | King, III et al. |
| 2013/0073809 A1 | 3/2013 | Antani et al. |

* cited by examiner

US 8,898,680 B2

SYSTEM AND METHOD FOR SUPPORTING ASYNCHRONOUS MESSAGE PROCESSING IN A DISTRIBUTED DATA GRID

CLAIM OF PRIORITY

This application claims priority on U.S. Provisional Patent Application No. 61/714,100, entitled "SYSTEM AND METHOD FOR SUPPORTING A DISTRIBUTED DATA GRID IN A MIDDLEWARE ENVIRONMENT," by inventors Robert H. Lee, Gene Gleyzer, Charlie Helin, Mark Falco, Ballav Bihani and Jason Howes, filed Oct. 15, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES APPLICATIONS

The current application hereby incorporates by reference the material in the following patent applications: U.S. patent application Ser. No. 13/671,369, entitled "SYSTEM AND METHOD FOR SUPPORTING GUARANTEED MULTI-POINT DELIVERY IN A DISTRIBUTED DATA GRID", by inventors Robert H. Lee and Gene Gleyzer, filed Nov. 7, 2012.

U.S. patent application Ser. No. 13/671,376, entitled "SYSTEM AND METHOD FOR PROVIDING PARTITION PERSISTENT STATE CONSISTENCY IN A DISTRIBUTED DATA GRID", by inventors Robert H. Lee and Gene Gleyzer, filed Nov. 7, 2012.

U.S. patent application Ser. No. 13/671,408, titled "SYSTEM AND METHOD FOR SUPPORTING TRANSIENT PARTITION CONSISTENCY IN A DISTRIBUTED DATA GRID", inventors Robert H. Lee and Gene Gleyzer, filed Nov. 7, 2012.

U.S. patent application Ser. No. 13/671,481, titled "SYSTEM AND METHOD FOR SUPPORTING OUT-OF-ORDER MESSAGE PROCESSING IN A DISTRIBUTED DATA GRID", inventors Mark Falco and Gene Gleyzer, filed Nov. 7, 2012.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support asynchronous message processing in a distributed data grid. A cluster node in the distributed data grid can provide a message processor running on a message processing thread. The message processor can receive a request to process an incoming message from a service thread, wherein the request is associated with a continuation data structure. Then, the message processor can wrap the continuation data structure in a return message after processing the incoming message, and forward the return message to a service queue that is associated with the service thread.

DETAILED DESCRIPTION

Figure 1:
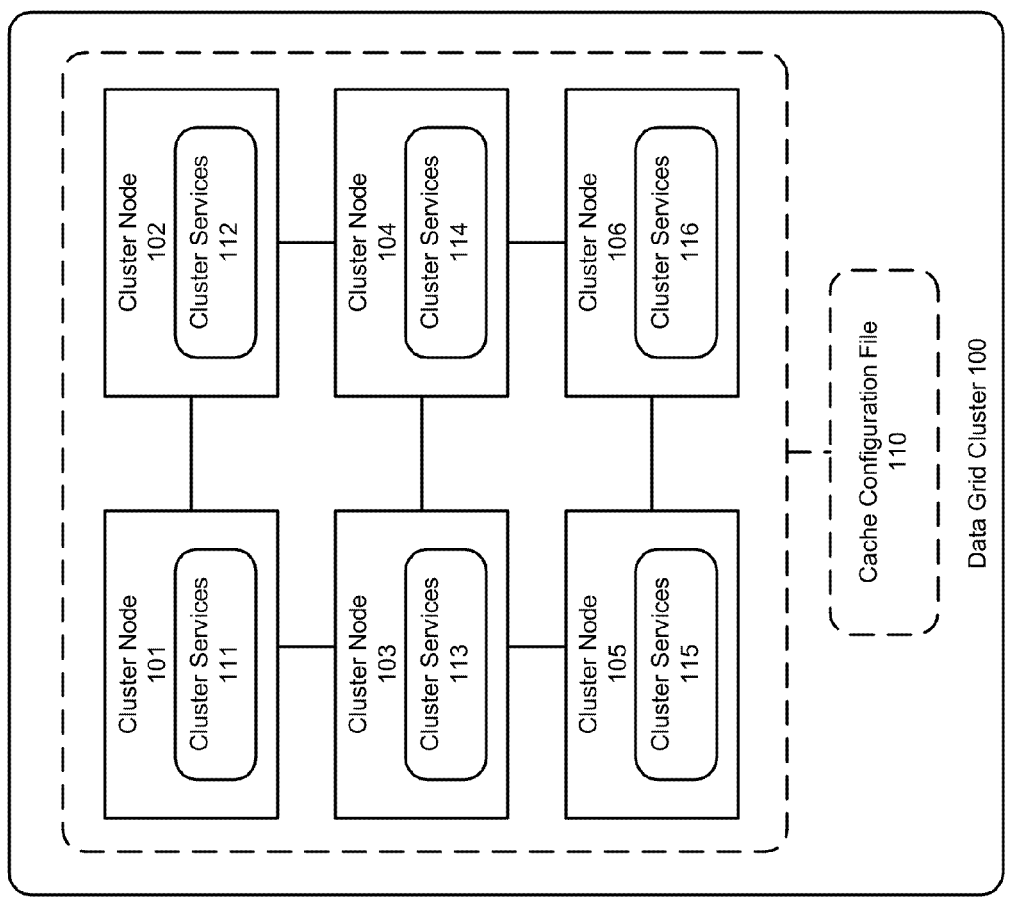
FIG. 1 is an illustration of a data grid cluster in accordance with various embodiments of the invention.

Described herein are systems and methods that can support asynchronous message processing in a distributed data grid.

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Asynchronous Message Processing

In accordance with various embodiments of the invention, the distributed data grid can support asynchronous message processing based on the using of both a continuation data structure and a message processing pattern. The continuation data structure can represent the control state of a computational process at a given point in execution and can allow the computational process to resume execution at a later point in time on another thread. Furthermore, the message processing pattern can be used to forward a received message to a subscriber for processing, based on a message queue in the distributed data grid.

Figure 2:
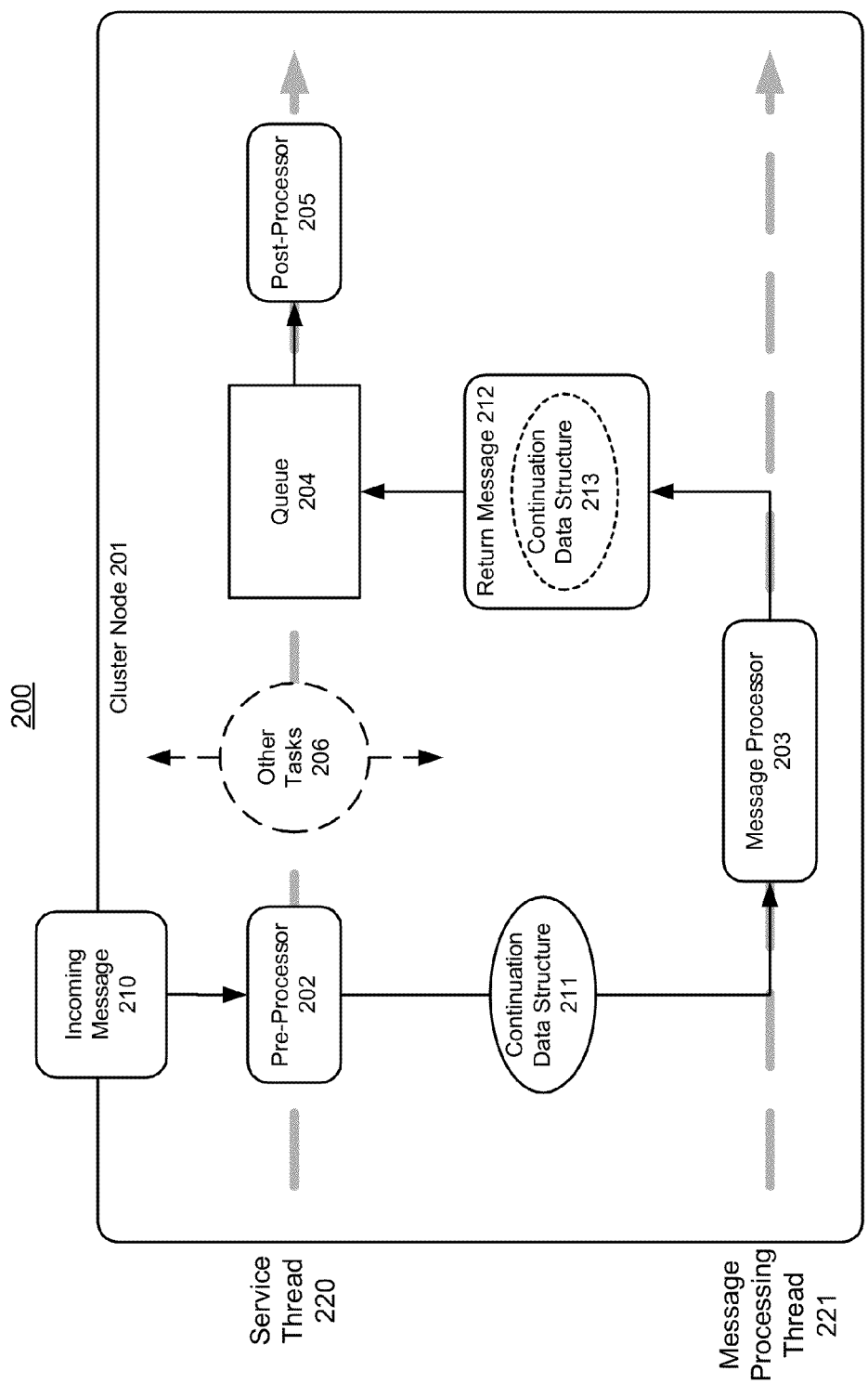
FIG. 2 is an illustration of supporting asynchronous message processing in a distributed data grid in accordance with various embodiments of the invention.

FIG. 2 is an illustration of supporting asynchronous message processing in a distributed data grid in accordance with various embodiments of the invention. As shown in FIG. 2, a cluster node 201 in a distributed data grid 200 can receive an incoming message 210 from an outside client or another cluster node. The processing of the incoming message 210 can trigger various actions or operations in the distributed data grid 200, such as a reading or writing operation on the distributed data grid 200.

A service thread 220 on the cluster node 201, e.g. a cluster service thread or a partition cache thread, can be responsible for handling the received incoming message 210. Since the service thread 220 can be a thread on the cluster node 201 that facilitates various other data grid operations, performing message processing on the service thread 220 can become a bottleneck that may affect the performance of the distributed data grid 200. Thus, it may be preferable to dispatch the processing of the incoming message 210 to other threads on the cluster node 201.

In accordance with various embodiments of the invention, an asynchronous message processing scheme can include three stages: a pre-processing stage, an asynchronous message processing stage, and a post-processing stage. While the pre-processing stage and the post-processing stage can be performed on the service thread 220, the asynchronous message processing stage can be performed on another thread, e.g. a message processing thread 222, in order to alleviate the bottleneck on the service thread 220.

As shown in FIG. 2, the cluster node 201 can use a pre-processor 202 on the service thread 220 to process the incoming message 210. Then, the cluster node 201 can dispatch the processing of the received incoming message 210 from the service thread 220 to a message processing thread 221.

The pre-processor 202 on the service thread 220 can send a continuation data structure 211 to a message processor 203 on the message processing thread 222 along with the request. The continuation data structure 211 can represent the control state for processing the incoming message 210 on the service thread 220. Thus, the continuation data structure 211 can store attributes for continuing the processing of the incoming message 210 on the message processing thread 221.

After the message processor 203 on the message processing thread 221 finishes processing the incoming message, the message processing thread 221 can wrap a continuation data structure 213 in a return message 212, and send the return message 212 to a service queue 204 associated with the service thread 220. The continuation data structure 213 in the return message 212 can be created by the message processor 203 on the message processing thread 221, based on the continuation data structure 211 that was received from the service thread 220.

Then, a post-processor 205 on the service thread 220 can pick up the return message 212 from the service queue 204 and process the return message 212 accordingly, e.g. based on the message processing pattern supported in the distributed data grid 200. The outcome of processing the return message 212 on the service thread 220 is that the service thread 220 can perform post-processing of the incoming message 210 based on the continuation data structure 213 wrapped in the return message 212.

Unlike the traditional continuation programming scheme, the asynchronous message processing scheme ensures that the post-processing of the incoming message 210 always returns to the originating service thread 220, instead of on a random thread. Also, using the asynchronous message processing scheme, the service thread 220 is not blocked and can perform other tasks 206, while the message processing thread 221 is processing the incoming message 210.

For example, a cluster service thread 220 on the cluster node 201 can receive an incoming message 210 that contains a request from a new node to join the distributed data grid 201 based on a join protocol. The cluster service thread 220 can dispatch the processing of the incoming message 210, such as establishing membership for the new node, to a message processing thread 221. Then, the cluster service thread 220 may only allow the new node to join the distributed data grid 201 after the cluster service thread 220 receives a return message 212 from the message processing thread 221 that confirms the membership.

Figure 3:
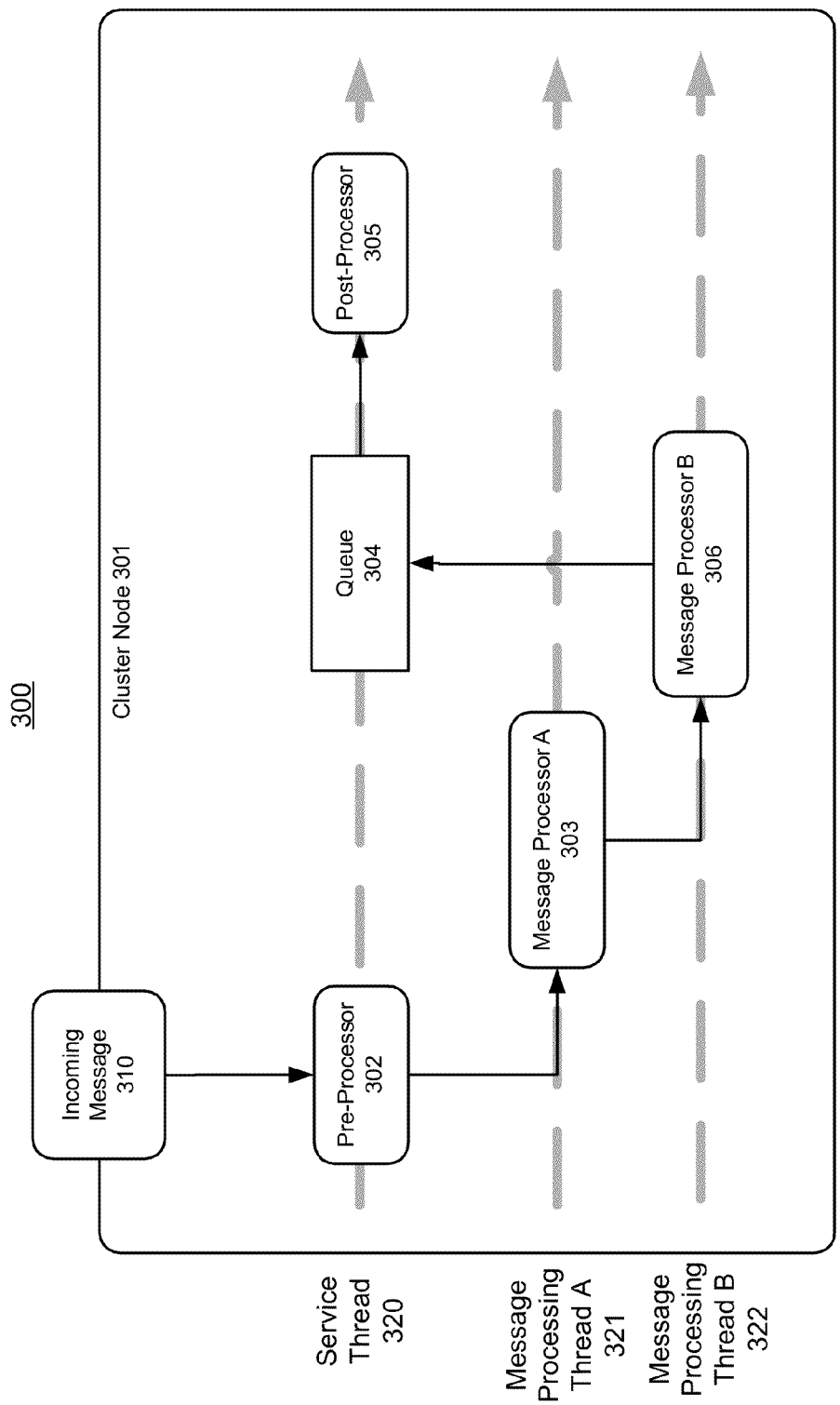
FIG. 3 is an illustration of supporting nested asynchronous message processing in a distributed data grid in accordance with various embodiments of the invention.

FIG. 3 is an illustration of supporting nested asynchronous message processing in a distributed data grid in accordance with various embodiments of the invention. As shown in FIG. 3, a cluster node 301 in a distributed data grid 300 can receive an incoming message 310 from an outside client or another cluster node. A pre-processor 302 on a service thread 320 can pre-process the incoming message 310 and dispatch it to a message processor A 303 on the message processing thread A 321.

Furthermore, instead of returning the processing of the message 310 to the service thread 320 directly, the message processor A 303 can dispatch the message 310 to another message processor B 306 on the message processing thread B 322 for further message processing.

Then, after the message processor B 322 finishing processing the incoming message 310, the message processor B 322 can send a return message to a message queue 304 on the service thread 320. Finally, the cluster node 201 can use a post-processor 305 on the service thread 320 to continuingly process the incoming message 310.

Figure 4:
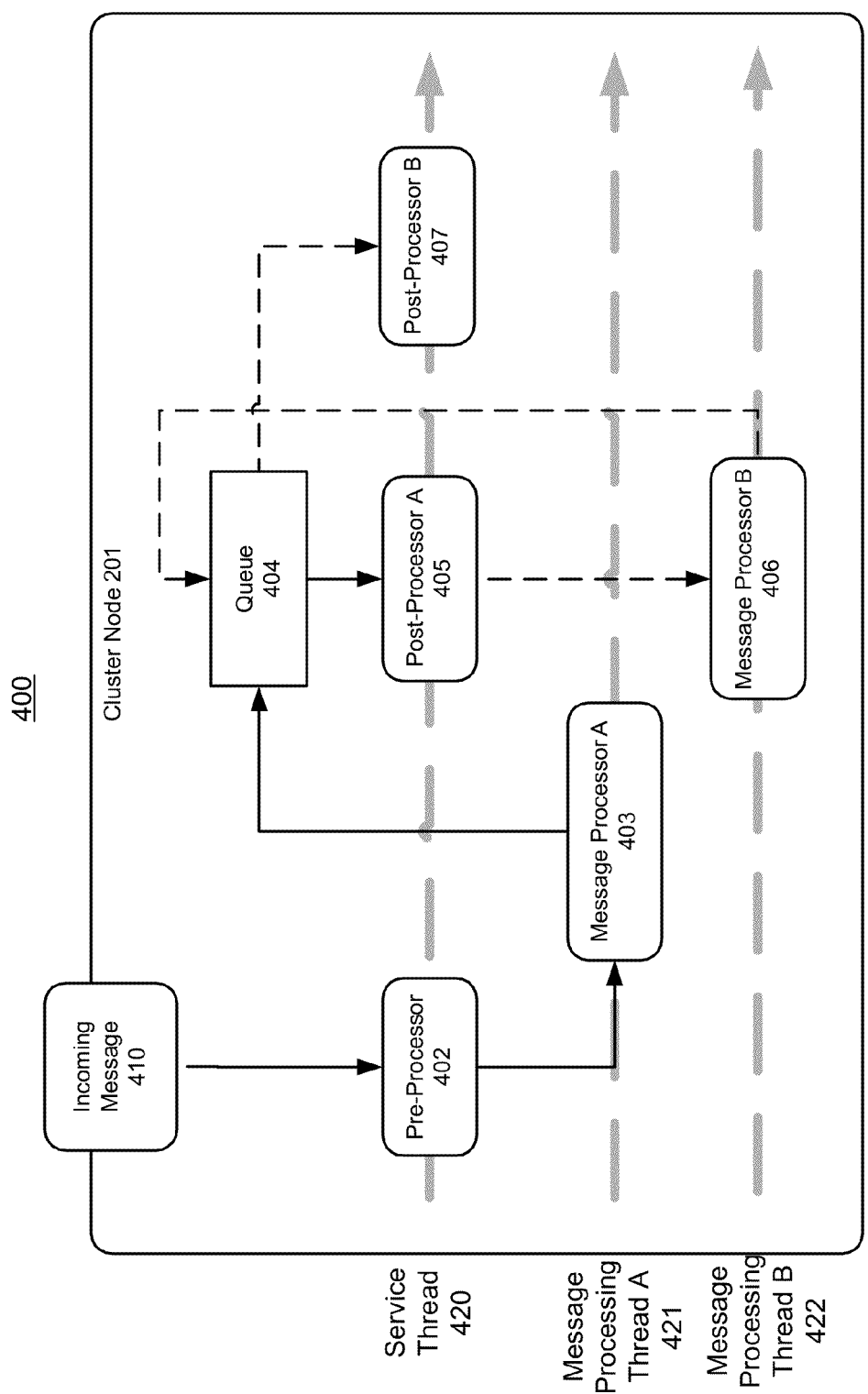
FIG. 4 is an illustration of supporting chained asynchronous message processing in a distributed data grid in accordance with various embodiments of the invention.

FIG. 4 is an illustration of supporting chained asynchronous message processing in a distributed data grid in accordance with various embodiments of the invention. As shown in FIG. 4, a cluster node 401 in a distributed data grid 400 can receive an incoming message 410 from an outside client or another cluster node. A pre-processor 402 on a service thread 420 can pre-process the incoming message 410 and dispatch it to a message processor A 403 on a message processing thread A 421.

After the message processor A 403 finishes processing the incoming message 410, the the message processor A 403 can forward the process to a post-processor A 405 on the service thread 420, via the message queue 404. Then, the cluster node 401 can continue processing the incoming message 410 using the post-processor A 405 on the service thread 420.

Furthermore, the cluster node 401 can use another message processor B 406 on another message processing thread B 422 to continue processing the incoming message 410. Finally, the cluster node 401 can use another post-processor B 407 on the service thread 420 to finish up the process.

Figure 5:
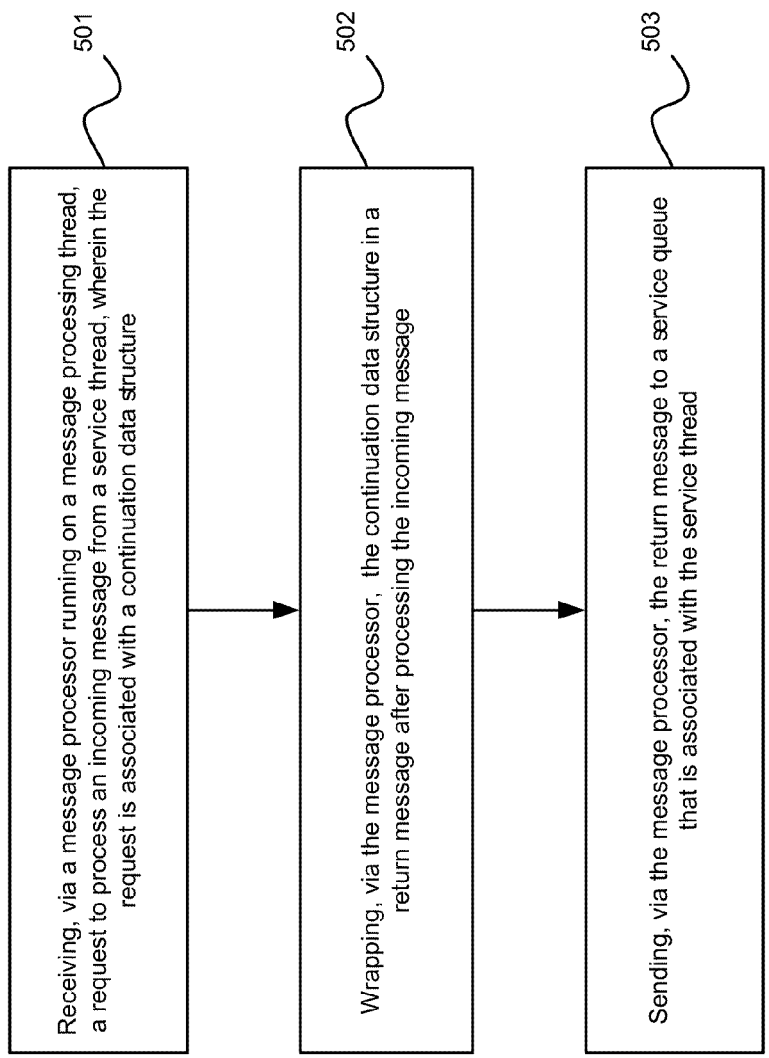
FIG. 5 illustrates an exemplary flow chart for supporting asynchronous message processing in a distributed data grid in accordance with an embodiment of the invention.

FIG. 5 illustrates an exemplary flow chart for supporting asynchronous message processing in a distributed data grid in accordance with an embodiment of the invention. As shown in FIG. 5, at step 501, a message processor running on a message processing thread can receive a request to process an incoming message from a service thread, wherein the request is associated with a continuation data structure. Then, at step 502, the message processor can wrap the continuation data structure in a return message after processing the incoming message. Furthermore, at step 503, the message processor can send the return message to a service queue that is associated with the service thread.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method comprising:
   providing a node in a distributed data grid having a plurality of nodes, wherein said node comprises a first message processing thread, and a service thread having an associated service queue;
   receiving an incoming message at said service thread;
   preprocessing the incoming message in said service thread and generating a continuation data structure, wherein said continuation data structure represents a control state of a computational process on said service thread which allows said computational process to resume execution at a later point in time on said first message processing thread;
   transmitting a request to process the incoming message from said service thread to said first message processing thread, wherein the request is transmitted with the continuation data structure;
   processing the incoming message in said first message processing thread using said continuation data structure;
   generating a return message in said first message processing thread;
   wrapping, via said first message processing thread, the continuation data structure in said return message; and
   sending said return message and said continuation data structure from said first message processing thread to said service queue.

2. The method according to claim 1, wherein:
   processing the incoming message in said first message processing thread is performed asynchronously without blocking said service thread.

3. The method according to claim 1, wherein the service thread is a partition cache thread.

4. The method according to claim 1, further comprising:
   allowing the service thread to perform other tasks while the first message processing thread is processing the incoming message.

5. The method according to claim 1, further comprising:
   retrieving said return message and said continuation data structure from said service queue into said service thread; and
   post-processing said return message and said continuation data structure in said service thread.

6. The method according to claim 5, wherein:
   post-processing said return message and said continuation data structure in said service thread includes performing a post-processing task for the incoming message based on the continuation data structure wrapped in the return message.

7. The method according to claim 1, further comprising:
   allowing the incoming message to contain a request from another node to join the distributed data grid based on a join protocol.

8. The method according to claim 1, wherein said node further comprises a second message processing thread, said method further comprising:
   allowing the first message processing thread to process the incoming message on the second message processing thread.

9. The method according to claim 1, wherein said node further comprises a second message processing thread, said method further comprising:
   allowing the service thread to continue processing the incoming message on the second message processing thread.

10. A system comprising:
   one or more microprocessors;
   a node in a distributed data grid having a plurality of nodes, wherein said node runs on said one or more microprocessors and comprises a first message processing thread, and a service thread having an associated service queue;
   wherein said node is configured to:
      receive an incoming message at said service thread,
      reprocess the incoming message in said service thread and generate a continuation data structure, wherein said continuation data structure represents a control state of a computational process on said service thread which allows said computational process to resume execution at a later point in time on said first message processing thread,
      transmit a request to process the incoming message from said service thread to said first message processing thread, wherein the request is transmitted with the continuation data structure,
      process the incoming message in said first message processing thread using said continuation data structure,
      generate a return message in said first message processing thread,
      wrap the continuation data structure in said return message in said first message processing thread, and
      send said return message and said continuation data structure from said first message processing thread to said service queue.

11. The system according to claim 10, wherein:
   said node is configured to process the incoming message in said first message processing thread asynchronously without blocking said service thread.

12. The system according to claim 10, wherein the service thread is a partition cache thread and wherein the incoming message contains a request from another node to join the distributed data grid based on a join protocol.

13. The system according to claim 10, wherein:
   the node is configured to allow the service thread to perform other tasks while the first message processing thread is processing the incoming message.

14. The system according to claim 10, wherein said node is further configured to:
   retrieve said return message and said continuation data structure from said service queue into said service thread; and
   post-process said return message and said continuation data structure in said service thread.

15. The system according to claim 10, wherein said node is further configured to:
   retrieve said return message and said continuation data structure from said service queue into said service thread; and
   perform a post-processing task for the incoming message in said service thread based on the continuation data structure wrapped in the return message.

16. The system according to claim 10, wherein:
   said node further comprises a second message processing thread; and
   said node is further configured to allow said first message processing thread to process the incoming message on the second message processing thread.

17. The system according to claim 10, wherein:
   said node further comprises a second message processing thread; and
   said node is further configured to allow said service thread to continue processing the incoming message on the second message processing thread.

18. A non-transitory machine readable storage medium having instructions stored thereon that when executed cause a system to perform steps comprising:
   providing a node in a distributed data grid having a plurality of nodes, wherein said node comprises a first message processing thread, a service thread having an associated service queue;
   receiving an incoming message at said service thread;
   preprocessing the incoming message in said service thread and generating a continuation data structure, wherein said continuation data structure represents a control state of a computational process on said service thread which allows said computational process to resume execution at a later point in time on said first message processing thread;
   transmitting a request to process the incoming message from said service thread to said first message processing thread, wherein the request is transmitted with the continuation data structure;
   processing the incoming message in said first message processing thread using said continuation data structure;
   generating a return message in said first message processing thread;
   wrapping, via said first message processing thread, the continuation data structure in said return message; and
   sending said return message and said continuation data structure from said first message processing thread to said service queue.

19. The non-transitory machine readable storage medium of claim 18 wherein:
   processing the incoming message in said first message processing thread is performed asynchronously without blocking said service thread.

20. The non-transitory machine readable storage medium of claim 18 having instructions stored thereon that when executed cause a system to perform steps further comprising:
   allowing the service thread to perform other tasks while the first message processing thread is processing the incoming message.

* * * * *

UNITED STATES PATENT AND TRADEMARK OFFICE
CERTIFICATE OF CORRECTION

| | | |
|---|---|---|
| PATENT NO. | : 8,898,680 B2 | Page 1 of 1 |
| APPLICATION NO. | : 13/671395 | |
| DATED | : November 25, 2014 | |
| INVENTOR(S) | : Gene Gleyzer | |

It is certified that error appears in the above-identified patent and that said Letters Patent is hereby corrected as shown below:

In the specification

Column 5, line 19, before "message" delete "the".

In the claims

Column 7, line 15, Claim 10, delete "reprocess" and insert -- preprocess --, therefor.

Signed and Sealed this
Third Day of May, 2016

Michelle K. Lee
*Director of the United States Patent and Trademark Office*